United States Patent [19]

Mani

[11] Patent Number: 4,775,543

[45] Date of Patent: Oct. 4, 1988

[54] METHOD OF MAKING POCKET BREAD HAVING PRESSURE RELIEF HOLE

[76] Inventor: Daniel Mani, 838 North Doheny Dr. #501, Los Angeles, Calif. 90069

[21] Appl. No.: 911,107

[22] Filed: Sep. 23, 1986

Related U.S. Application Data

[63] Continuation-in-part of Ser. No. 888,573, Jul. 21, 1986, abandoned.

[51] Int. Cl.⁴ ............................................. A21D 8/02
[52] U.S. Cl. .................................. 426/496; 426/138; 426/502; 426/549
[58] Field of Search ............... 426/496, 138, 502, 549

[56] References Cited

U.S. PATENT DOCUMENTS

4,202,911  5/1980  Papanatoniou et al. ............ 426/502
4,597,979  7/1986  Goglanian ........................... 426/496

Primary Examiner—Joseph Golian
Attorney, Agent, or Firm—Blakely, Sokoloff, Taylor & Zafman

[57] ABSTRACT

A pocket or pita bread, and method of making the same, is described. The invented pita bread comprises a pressure relief hole provided in a seam thereon to relieve the pressure formed therein by the heated air therein during baking. In the invented method, a predetermined portion of each pita bread is heat shielded during baking, preferably by overlapping each pair of pita breads or folding over an edge of the pita bread prior to the baking thereof.

3 Claims, 3 Drawing Sheets

TO OVEN

To Oven

METHOD OF MAKING POCKET BREAD HAVING PRESSURE RELIEF HOLE

STATEMENT OF RELATED CASES

The present application is a continutation-of-part of U.S. Ser. No. 888,573 filed on July 21, 1986, now abandoned.

FIELD OF THE INVENTION

The present invention relates to pocket or pita bread and the method of making the same, and more particularly, to a pocket bread and method where a relief hole is provided for relieving pressure in the interior thereof during baking.

BACKGROUND OF THE INVENTION

Pita bread is a bread of Middle Eastern origin. It is estimated to have been in existence for over 2000 years. The bread is typically circular or oval and is relatively flat. The diameter of the circular pita bread generally ranges from 3 to 9 inches, although larger and smaller loaves may also be found. A pita bread loaf comprises a single piece of circular bread having an upper and lower face forming an internal chamber, called a pocket. The upper and lower faces are attached along the perimeter of each loaf. Typically a pita bread loaf is cut either along its diameter or along cord off-center from said diameter. This cutting exposes the pockets of the two portions of the loaf which may be then filled with other food ingredients such as is well known in the art. The position of the cut generally depends on the size or the amount of food ingredients used in filling the pockets. Typically, such food ingredients include one or more of vegetables, meats, breads, and grains, and the food material is generally covered with a sauce.

A problem arises in that many times the liquid portion of the food ingredients disposed within the pocket can leak out of the seam or upper or lower face of the pocket bread causing annoying and messy dripping on the pita eater. To some extent, the leakage is a result of absorbtion of the liquids into the bread. However, to a large extent the leakage is caused by events which result during the baking process of the pita bread. For a complete understanding of these effects, it is helpful to review the standard method used in preparation of the commercial pita bread. In the first step, the mixture of the pita bread dough including water, flour, yeast, salt, and any other ingredients, is mixed together in a large mixer for approximately 15 minutes. In the second step, the pita bread is proofed for 30 minutes, which means that the pita bread is allowed to rest, during which time fermentation takes place. In the third step, the pita dough is cut and rounded into a ball shape in a machine provided for that purpose. In the fourth step, the dough is again proofed for 15 to 20 minutes allowing it to further ferment. In the fifth step, the pita is run through a sheeter which first flattens the dough in one direction forming an egg or oval shaped portion, and then the dough is flattened in a second direction to provide it with a substantially circular conformation. In the six step, the dough is then proofed another time for 15 to 20 minutes. Generally, anywhere between the third and the six step, the dough is placed upon a conveyor which carries it from one step to the next up through the cooling step noted below. In the seventh step, the dough is baked in an oven set at approximately 1500 degrees Fahrenheit for 25 to 30 seconds. Prior to the baking step, as the dough enters the oven, there is usually a person, or machine, which ensures that the individual pieces of pita dough are separated, and not touching, to avoid having the individual pita loaves stick together.

During the baking step, the upper and lower surfaces of the pita which form the pocket expand as the air inside expands until the pressure inside the pita is so great that cracks and crevices, herein called faults, form in the upper and/or lower surfaces of the pita loaf or in the seams or perimeter between the upper and lower surface. It is these crevices or faults which cause the pita to leak at any of a number of arbitrary positions thereon.

Finally, after the baking step in the oven, the bread is cooled in step 8 and then packaged in step 9 for commercial distribution.

At the present time there is only one prior art method of manufacturing pita bread having a pressure relief system to allow the release of hot air and gases in the pita bread thereby preventing the aforemention undesired crevices and cracks in the surface thereof. This method is described in U.S. Pat. No. 4,597,979 which discloses providing a rupture line comprising a weakened area along the surface of the pita bread by preforating, flattening, thinning, or otherwise structurally weakening the dough prior to the baking thereof. Thus, as disclosed in the Patent, when the dough is baked, the mechanically-weakened area ruptures thereby causing a tearline to form as a result of the hot air and gases bursting through the surface of said pita. In addition, it is also claimed that this method allows the user of the pita bread to easily tear the pita bread along the rupture line. The method of U.S. Pat. No. 4,597,979 requires in addition to the regular steps of making pita bread, the scoring, thinning, perforating and otherwise causing a weakened rupture line to the dough prior to baking. This process requires additional time and as well, additional machinery, thereby slowing down the process and/or increasing the cost of making the pita bread.

Furthermore, in all of the prior art systems, there is an intentional separation of the different loaves prior to baking them into the oven, for the purpose of preventing the loaves from sticking together. The present invention solves the problems of the prior art with respect to the formation of unpredictable faults in the pita bread causing leakage therethrough.

SUMMARY OF THE INVENTION

The present invention comprises a loaf of pita bread having a weakened area out of which heated air disposed therein during the baking step in the production of the pita bread is released therethrough. The heated air escape hole provided in the pita bread is disposed in the seam thereof at a predetermined position. By so providing the pita bread with such a weakened area so that gases can be released therefrom, the invented pita loaf does not develop crevices or cracks in any undesired location such as arbitrary points along the seam between the top and bottom surface of the loaf or on the top or bottom surface of the loaf itself, any of which can cause the pita loaf to leak liquid during or following the stuffing the same with food.

In making the invented pita loaves, the same steps as those described above which are known in the art are used to prepare the loaves. However, prior to baking the loaves, which are normally baked in an oven fed by a conveyor belt having usually four loaves across, each pair of loaves is manually or automatedly overlapped approximately ½ inch. Thus, when the loaves are cooked in the oven as previously described, the portion of the loaf overlapping both on the top and the bottom will not cook as much as the remainder of the loaf. This creates a weakened area so that when the loaf expands upon heating, the overlapped portion tears open thereby allowing the hot air enclosed therein to be released.

In an alternative embodiment, the method of producing the invented pita loaves may include covering over a small portion of the edge of the loaf with a heat shield during baking in order to partially shield the loaf from the excess heat. For example, the conveyor can be provided with a heat shield disposed along the edge thereof under which an edge of each pita loaf passes thereby partially reflecting the heat and preventing full cooking of the loaf. In an alternative embodiment, the conveyor system can be supplied with a drop which drops the pita bread from one level to another so that each pita loaf is compressed and thickened on an end thereof thereby preventing complete cooking of the compressed end.

In another embodiment of the present invention after the dough is placed on the conveyor belt an end thereof is folded back onto a portion of the remainder of the pita bread dough s that a thickened area is provided on one edge thereof. The edge can be folded-over by any automatic mechanical means or manually by the use of the spatula, spoon or the like to form a thickened portion of the pita loaf at the edge thereof. The amount of fold-over is not critical to the practice of the present invention, but in the preferred embodiment approximately ½ to 1 inch of dough is folded-over at the edge. The loaf in then baked as described above and the thickened portion which fails to bake completely in the heated oven blows out as the pressure inside the pita loaf increases thereby forming a pressure relief hole.

In all of the above-described embodiments, after the pressure relief hole is formed and the loaf is completely baked and cooled, the ruptured end maybe cut off neatly to form in aesthetically and commerically acceptable pita loaf having an even edge.

It is one object of the present invention to provide a pita bread having a weakened area for release of heated air formed therein during baking.

It is another object of the present invention to provide a pita bread having a hole in the seam thereof for the release of such air.

It is yet another object of the present invention to provide a method of manufacturing pita bread whereby a weakened area is provided for the release of hot air during baking.

It is yet another object of the present invention to provide a method of manufacturing the invented pita bread which can be performed using existing commercial equipment.

The foregoing and other objects of the invention will be understood from the detailed disclosure provide herein.

DETAILED DESCRIPTION

Figure 1:
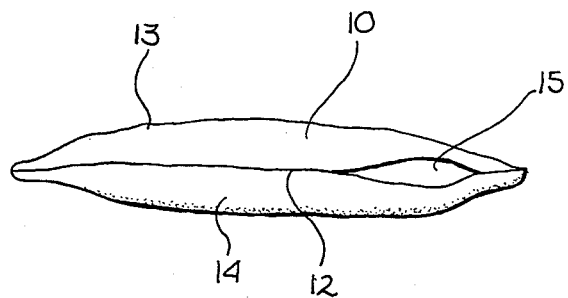
FIG. 1 is a side view of an invented pita loaf showing a pressure release hole in the seam thereof.
Figure 2:
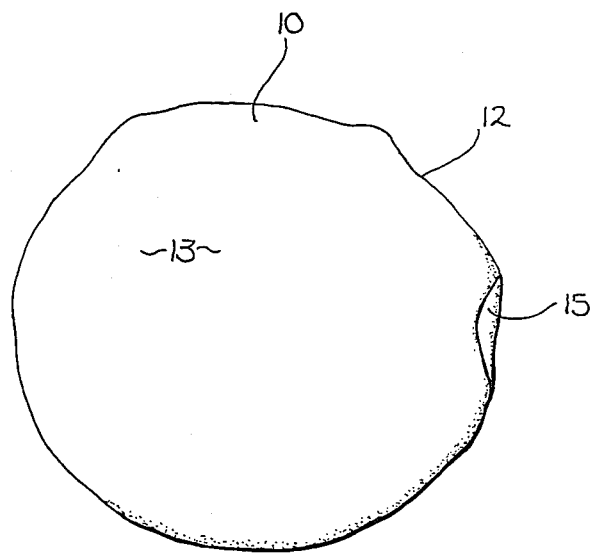
FIG. 2 is plan view of the invented pita loaf showing a pressure relief hole.
Figure 3:
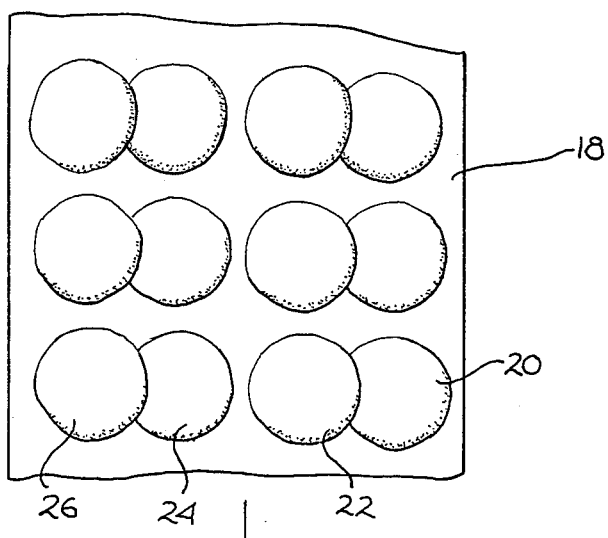
FIG. 3 is a partial view of a conveyor which may be utilized in the present invention showing the overlap of the pita loaves prior to baking.
Figure 4:
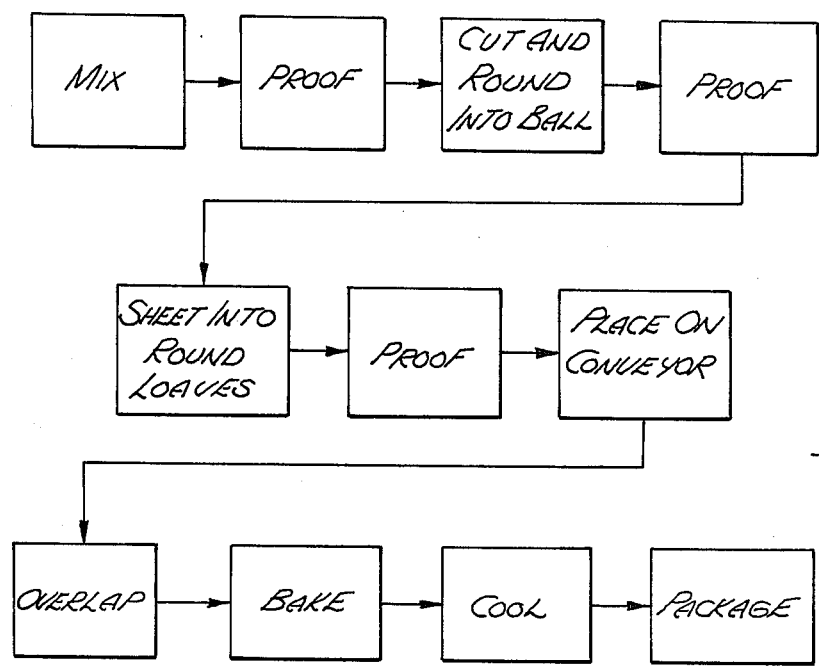
FIG. 4 is a schematic view of a preferred method of making the invented pita loaves.
Figure 5:
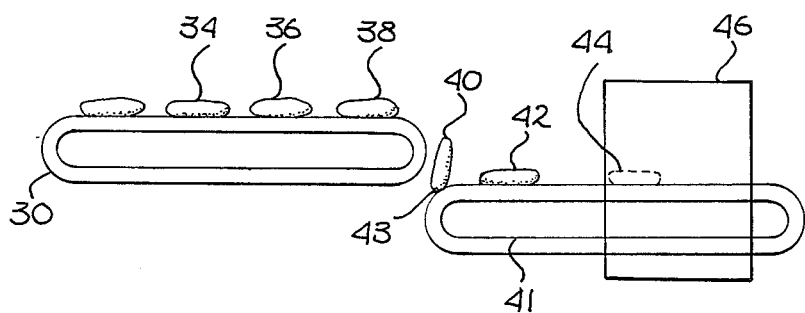
FIG. 5 is a side view of equipment which may be used in the process of making the invented pita loaf utilizing an alternative embodiment.
Figure 6:
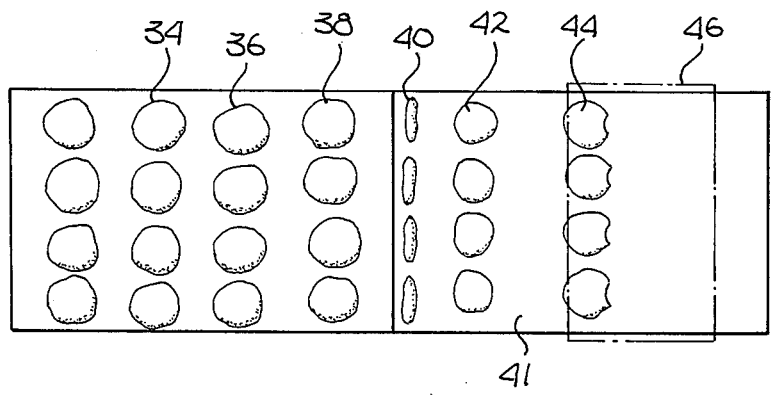
FIG. 6 is a top plan view of the equipment depicted in FIG. 5.

The present invention is best understood with reference to the drawings appended hereto. FIGS. 1 and 2 depict the invented pita loaf, FIGS. 3 and 4 illustrate the method of making the same, and FIGS. 5 and 6 illustrate an alternative embodiment to the preferred method.

First turning to FIGS. 1 and 2, the invented pita bread loaf comprises a substantially round loaf 10 having a seam 12 connecting the upper portion of the pita loaf 13 with the lower portion 14. Disposed at a predetermined postion on the seam is a hole 15 which allows the hot air formed during baking to escape. The hole can be made by any number of ways, and can be disposed in any of a number of positions some of which are described herein. However, it has been determined that the hole must be made by providing a weakened area in the pita loaf 10, preferably in the seam thereof so that a minimal amount of surface area of the pita loaf is faulted and thereby creating a greater area which ma be stuffed with the food materials.

The hole or weakened area 15 is preferably formed by providing a mean which at least partially limits the amount that a predetermined portion of the pita loaf is baked. In the preferred embodiment, in a commercial manufacturing system, a conveyor 18 is used to carry the pita loaf through an oven, during which time the oven is heated at a temperature of approximately 1500 degrees and the loaves are exposed to such temperature for approximately 25 to 30 seconds. In the prior art systems, a person is usually stationed along the conveyor to ensure that none of the individual loaves of pocket bread are touching prior to their baking. On the other hand, in the invented method, the pita loaves are intentionally overlapped slightly, approximately ½ inch, although the range of overlap can be anywhere from ¼ inch to 2 inches. Obviously, the more overlap that is provided on the conveyors, the more dough is wasted. As shown in FIG. 3, pita loaf 22 overlaps pita loaf 20 and pita loaf 26 overlaps 24. In this position, because of the overlap, the pita loaves do not fully bake at the area of the overlap and therefore, the overlap portions are weaker than the fully baked portions. Thus, as the pita loaves are heated in the oven, and the hot air inside each loaf expands, the weaker overlapping area blows out forming a hole thereby allowing the hot air to escape. The loaves may be overlapped manually or by machine. By providing an identifiable predetermined escape hole for the hot air, the faults in the upper and lower surfaces and seam are eliminated, except for the escape hole, and the problem of pita loaf leakage is thereby eliminated.

In another form of the present invention, initially tried but found not as useful, the conveyor comprises a step which allows the pita to fall on one edge thereby compressing it into a thicker portion which will not cook as fully as the narrow portion formed through the sheeter. It was found that in this embodiment, in view of the fact that the pita loaves were not perfectly rounded, the loaves tended to roll somewhat or fall in various positions and compress to different degrees thereby providing a pita loaf with an inconsistent quality. This alternative embodiment is shown in FIGS. 5 and 6. A first conveyor 30 is provided with rounded and sheeted pita loaves 32, 34, 36 and 38 disposed thereon. As in the prior art, and as shown in FIG. 6, the pita loaves are disposed on the conveyor four across, although any combination and size of conveyor and pita loaf may be used. When the pita loaves reached the end of the covenyor, such as pita loaf 40, it drops to conveyor 41 as shown. In so dropping, the end 43 of loaf 40 compresses causing loaf 40 to form a thicker portion. This is best shown on loaf 42. Thereafter when the loaf enters the oven 46, the thicker end does not cook as much as the remainder narrower portion of the pita loaf and therefore, blows out forming a hole 45 in loaf 44, as shown in FIG. 6.

One other embodiment in the present invention includes the use of a heat shield disposed over a portion of the pita loaf to prevent the portion of the loaf under the shield from fully cooking. This heat shield would provide the same effect as the foregoing methods in allowing a portion of the pita loaf, preferably along its seam, to remain less cooked and therefore weaker.

Figure 7:
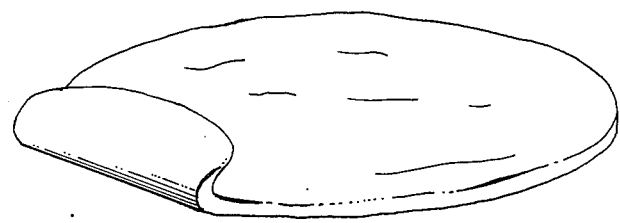
FIG. 7 is a perspective view of a pita loaf with a fold-over edge.
Figure 8:
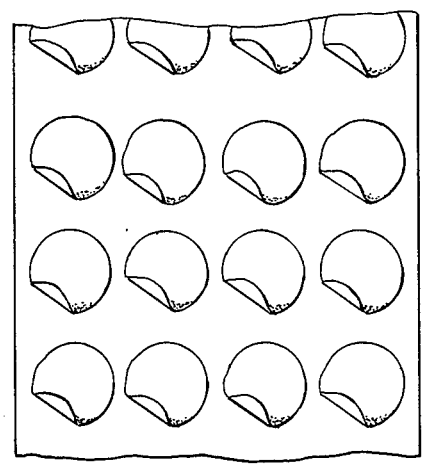
FIG. 8 illustrates a top plan view of a conveyor showing a plurality of pita loaves each having a fold-over edge as described in an alternative embodiment of making the pressure relief hole.
Figure 8:

In yet another embodiment of the present invention as shown in FIGS. 7 and 8, prior to the baking of the pita loaf an edge thereof is folded-over itself forming a thickened portion. The size of the overlapped portion is not critical, but in the preferred embodiment approximately ½ to 1 inch of edge overlaps the body of the loaf. As specifically shown in FIG. 7, the pita loaf 50 comprises the folded-over portion 51 which folds directly over and onto the remaining portion 52 of the pita loaf. As described above, the thickened portion resulting from the folded-over portion 51 does not bake as completely as the thinner portion 54 of the loaf so that when the loaf expands during the baking process, the folded-over portion blows out or ruptures after sufficient pressure builds up inside the loaf. As shown in FIG. 8, a plurality of folded-over pita loaves 50 are disposed on a conveyor 53 each having a folded-over portion 51. In the preferred embodiment at the present time, the folded-over portion can be made by means of a spatula, spoon, or the like by manual manipulation of the edge of the pita loaf to fold over the same. The conveyor 53 then carries the folded-over pita loaves 50 into the oven where they are baked and the folded-over portion 51 ruptures.

It will be obvious to one of ordinary skill in the art that a number of different of changes and modifications can be made to the preferred an alternative embodiments described herein without departing from the nature and scope of the present invention, which are defined by the claims appended hereto and all equivalents thereof.

I claim:

1. A method of making pocket bread having a pressure relief hole for releasing the pressure formed during baking dough comprising said pocket bread thereby preventing the formation of faults at positions other than at a predetermined position in said pocket bread, said method comprising baking a first pocket bread dough overlapping up to two inches with a second pocket bread dough thereby preventing a predetermined portion of said dough from fully baking.

2. The method of claim 1 wherein said dough comprising said first pocket bread is overlapped in the range of one quarter inch to two inches over said dough comprising said second pocket bread.

3. The method of claim 2 wherein said dough comprising first pocket bread overlaps said second pocket bread approximately one-half inch.

* * * * *

UNITED STATES PATENT AND TRADEMARK OFFICE
CERTIFICATE OF CORRECTION

PATENT NO. : 4,775,543
DATED : 10/04/88
INVENTOR(S) : Daniel Mani

It is certified that error appears in the above-identified patent and that said Letters Patent is hereby corrected as shown below:

| COLUMN | LINE | DISCRIPTION |
|--------|------|-------------|
| 03 | 26 | delete "s" insert --so-- |
| 04 | 33 | delete "ma" insert --may-- |

Signed and Sealed this

Eleventh Day of April, 1989

Attest:

DONALD J. QUIGG

Attesting Officer   Commissioner of Patents and Trademarks